Dec. 8, 1936.   W. C. HEDGCOCK   2,063,738
WHEEL AND AXLE ASSEMBLY
Filed April 8, 1931
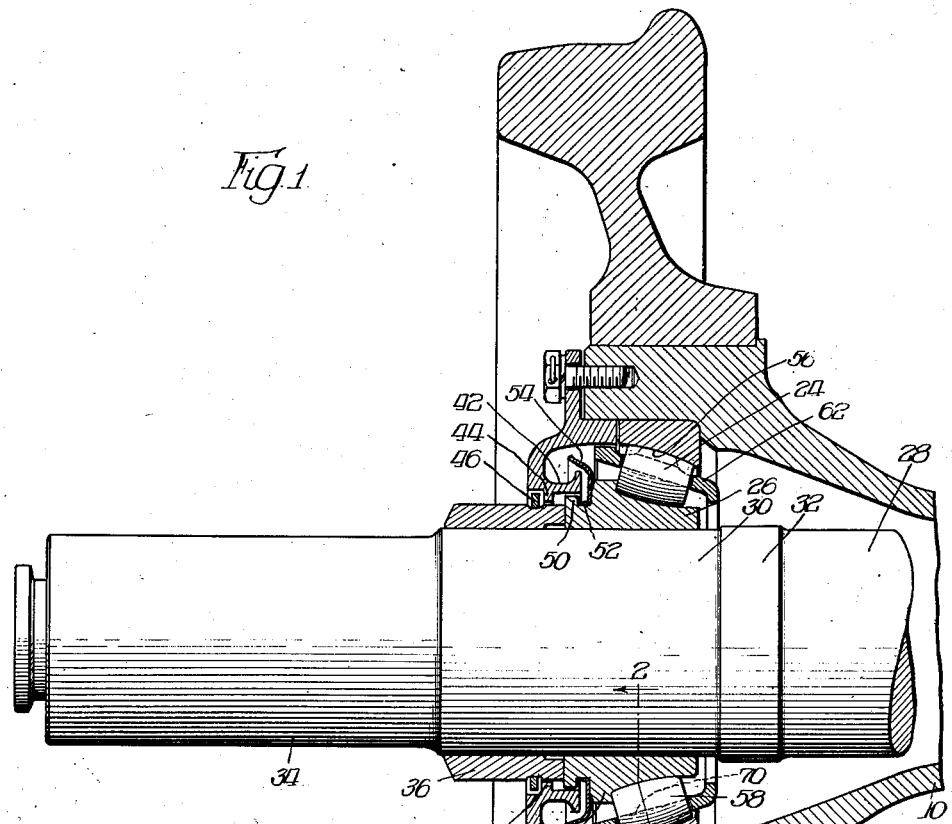
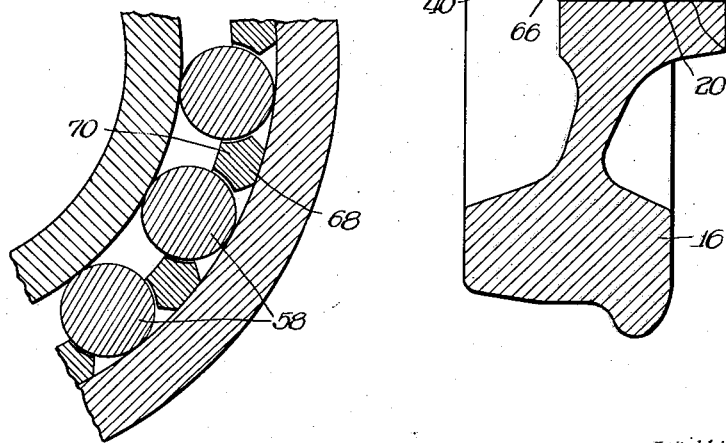
Inventor:
William C. Hedgcock
By Wilkinson, Huxley, Byron & Knight
Attys.

Patented Dec. 8, 1936

2,063,738

UNITED STATES PATENT OFFICE 2,063,738

WHEEL AND AXLE ASSEMBLY

William C. Hedgcock, Wilmette, Ill., assignor to American Steel Foundries, Chicago, Ill., a corporation of New Jersey Application April 8, 1931, Serial No. 528,547

10 Claims. (Cl. 308—214)

This invention pertains to wheel and axle assemblies, and more particularly to the arrangement of the structure of such assemblies for railway rolling stock.

Where anti-friction roller bearings are mounted for operation in an outer race within a revolving load supporting enclosure, and with an inner race mounted on a relatively stationary loading shaft the lowermost rollers in the bearing assembly are those which carry the load and the uppermost rollers are relatively free from load. In the usual roller bearing assemblies of this type the retainer is of the so-called floating type, whereby the retainer is carried by the rollers. In an installation of the kind just described the weight of the retainer is carried by the relatively free non-load-carrying upper rollers, the retainer hanging loosely in relation to the lowermost load-carrying rollers. The weight of the retainer on the free rollers tends to act as a brake on said rollers, thereby tending to reduce their speed of revolution below the normal speed at which they would revolve in their normal engagement with the races. This braking action on the free rollers reduces their rotative speed as they come out from under load, from which lower speed they must be again accelerated as they again go under load. The resultant rubbing between the retainer and the free rollers, and between the rollers and the races during deceleration and acceleration of the rollers introduces undesired friction and abrasion in the bearing assembly.

An object of this invention is to relieve the rollers of the weight of the retainer and therefore avoid this undesired friction of the load-carrying parts.

Another object of the invention is to provide a wheel and axle assembly having anti-friction bearings wherein structure is provided to properly space the rollers, yet will permit free rolling operation of the anti-friction members.

Yet another object of the invention is to provide anti-friction bearings wherein a spacing member, while moved by a portion of the assembly, still permits free operation of the anti-friction members.

Still another object of the invention is to provide an anti-friction bearing assembly wherein relative movements of portions of the assembly are permitted, but free operation of the anti-friction members is insured.

With these and various other objects in view, the invention may consist in certain novel features of construction and operation, as will be more fully described and particularly pointed out in the specification, drawing and claims appended hereto.

In the drawing, which illustrates an embodiment of the device and wherein like reference characters are used to designate like parts—

Figure 1 is a fragmentary sectional elevation through a wheel and axle assembly embodying the invention; and Figure 2 is an enlarged sectional elevation through the anti-friction bearings, the same being taken substantially in the plane as indicated by line 2—2 of Figure 1.

In the roller bearing construction illustrated only a portion of one bearing assembly will be described, though it is to be understood, of course, that the construction is the same at both ends of the axle.

In the construction shown, the normally rotatable axle or casing 10 is provided with a flared lubricant recess 12 terminating in a hub portion 14 on which the wheel 16 is mounted, the inner position of the wheel being limited by the shoulder 18. The lubricant recess terminates in an anti-friction bearing receiving portion 20 in which the outer race-ring or cup 22 of the anti-friction bearing assembly 24 is disposed. The inner race-ring or cone 26 is shrunk or press-fitted on the inner normally stationary axle 28 extending through the outer axle or casing 10, the cone being mounted on the bearing receiving portion 30, and either being disposed adjacent or abutting a shoulder 32 provided on said inner axle, depending on the type of bearing provided.

The inner axle shown is provided with the outer bearing portion 34 adapted to extend within and co-operate with the usual brasses and wedges in the standard A. R. A. journal box. This axle, of course, can be modified to be accommodated in any special form of journal box, or directly mounted in the side frame of a usual truck or through any intermediate members. The inner axle, though termed a stationary axle, may be a free axle permitted to creep, or a wholly fixed axle, or a semi-fixed axle, that is free to creep through a predetermined angle, the anchoring means when such is used being of any desired character.

The cone is retained in fixed position by means of the shrink collar 36 press-fitted on the bearing portion 30. The lubricant recess is closed by means of the cover plate 38 secured to the outer axle as at 40, the cover plate being provided with the inwardly extending channel forming flange 42 adapted to conduct lubricant to the base of the lubricant recess when motion of the assembly is arrested. The baffle forming construction 44 comprising the ring 46, the inwardly extending flange 48 of the cover plate and the upwardly extending flange 50 of the cone, prevents ingress of foreign matter to the bearing. The cone is provided with a channel 52 which may be used to conduct lubricant to a lower portion of the assembly, or may accommodate a baffle 54 disposed therein, with a portion overlying the channel 42 to direct lubricant toward the bearing.

The bearing engaging portion 56 of the cup is a portion of a sphere and engages a complementary bearing surface provided on the rollers 58. The cone is concaved in section, providing a proper bearing co-operating surface, and engaging the bearing surface of the rollers, the outer end of the cone being provided with a bearing engaging thrust shoulder 60. A cage or retainer 62 is provided, cooperating with the rollers and forming a spacing member therefor, the cage being provided with an outwardly extending outer flange 64 adapted to have guiding relation with either the flange 66 of the cover plate or with a portion of the cup, it being seen that the inner surface of the cover plate is formed with a prolongation of the bearing engaging surface of the cup. Of course the cup may have an extended portion engaging said flange of the cage. The cage is provided with depending members 68 being formed with a spherical surface corresponding to the surface of the cup whereby the outer race forms a guiding and supporting means for the retainer.

As the cup revolves with the wheel, the lubricant will be thrown outwardly by centrifugal force, and thus a sufficient lubrication of the engaging surfaces between the retainer and outer race is provided. This formation of the anti-friction bearing provides a self-aligning bearing, and, as the retainer spaces and guides the rollers, and as it conforms to the position of the latter in relation to the cup, it is adapted for sidewise rotary motion therewith within the cup.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. An anti-friction bearing comprising spaced race members, a plurality of rollers therebetween and having cooperative rolling engagement with the bearing surfaces of said race members, means on one of said race members cooperating with said rollers for transfer of lateral thrust therebetween, and a cage for retaining said rollers, said cage having a surface complementary to and contacting a substantial portion of the bearing surface of the outer of said race members at the central part thereof over which said rollers roll whereby the same is guided during operation.

2. An anti-friction bearing comprising spaced race members, a plurality of rollers therebetween and having cooperative rolling engagement with the bearing surfaces of said race members, means on one of said race members cooperating with said rollers for transfer of lateral thrust therebetween, and a cage for retaining said rollers, said cage having portions disposed between said rollers each provided with a surface complementary to and contacting a substantial portion of the bearing surface of the outer of said race members at the central part thereof over which said rollers roll whereby the same is guided during operation.

3. An anti-friction bearing comprising spaced race members, a plurality of rollers therebetween and having cooperative rolling engagement with the bearing surfaces of said race members, means on one of said race members cooperating with said rollers for transfer of lateral thrust therebetween, the other of said race members and said rollers having cooperating bearing surfaces providing for self-alignment of said bearing, and a cage for retaining said rollers, said cage having a surface complementary to and contacting a substantial portion of the bearing surface of the outer of said race members at the central part thereof over which said rollers roll whereby the same is guided during operation.

4. An anti-friction bearing comprising spaced race members, a plurality of rollers therebetween and having cooperative rolling engagement with the bearing surfaces of said race members, means on one of said race members cooperating with said rollers for transfer of lateral thrust therebetween, the other of said race members and said rollers having cooperating bearing surfaces providing for self-alignment of said bearing, and a cage for retaining said rollers, said cage having portions disposed between said rollers each provided with a surface complementary to and contacting a substantial portion of the bearing surface of the outer of said race members at the central part thereof over which said rollers roll whereby the same is guided during operation.

5. An anti-friction bearing comprising spaced race members, a plurality of rollers therebetween and having cooperative rolling engagement with the bearing surfaces of said race members, a shoulder on the inner of said race members engaged by said rollers for transfer of thrust therebetween, said rollers having arcuate bearing surfaces cooperating substantially throughout their length with a complementary bearing surface on the outer of said race members to provide for self-alignment of said bearing, and a cage for retaining said rollers, said cage having a surface complementary to and contacting a substantial portion of the arcuate bearing surface of said outer race member at the central part thereof over which said rollers roll whereby the same is guided during operation.

6. An anti-friction bearing comprising spaced race members, a plurality of rollers therebetween and having cooperative rolling engagement with the bearing surfaces of said race members, a shoulder on the inner of said race members engaged by said rollers for transfer of thrust therebetween, said rollers having arcuate bearing surfaces cooperating substantially throughout their length with a complementary spherical bearing surface on the outer of said race members to provide for self-alignment of said bearing, and a cage for retaining said rollers, said cage having a spherical surface complementary to and contacting a substantial portion of the spherical bearing surface of said outer race member at the central part thereof over which said rollers roll whereby the same is guided during operation.

7. An anti-friction bearing comprising spaced race members, a plurality of rollers therebetween and having cooperative rolling engagement with the bearing surfaces of said race members, a shoulder on the inner of said race members engaged by said rollers for transfer of thrust therebetween, said rollers having arcuate bearing surfaces cooperating substantially throughout their length with a complementary bearing surface on the outer of said race members to provide for self-alignment of said bearing, and a cage for retaining said rollers, said cage having portions disposed between said rollers each provided with a surface complementary to and contacting a substantial portion of the arcuate bearing surface of said outer race member at the central part thereof over which said rollers roll whereby the same is guided during operation.

8. An anti-friction bearing comprising spaced race members, a plurality of rollers therebetween and having cooperative rolling engagement with the bearing surfaces of said race members, a shoulder on the inner of said race members engaged by said rollers for transfer of thrust therebetween, said rollers having arcuate bearing surfaces cooperating substantially throughout their length with a complementary spherical bearing surface on the outer of said race members to provide for self-alignment of said bearing, and a cage for retaining said rollers, said cage having portions disposed between said rollers each provided with a spherical surface complementary to and contacting a substantial portion of the spherical bearing surface of said outer race member at the central part thereof over which said rollers roll whereby the same is guided during operation.

9. An anti-friction bearing comprising spaced race members, a plurality of rollers therebetween and having cooperative rolling engagement with the bearing surfaces of said race members, a thrust shoulder on the inner of said race members for cooperating with said rollers for transfer of lateral thrust therebetween, and a cage for retaining said rollers, said cage having a surface complementary to and contacting a substantial portion of the bearing surface of the outer of said race members at the central part thereof over which said rollers roll whereby the same is guided during operation.

10. An anti-friction bearing comprising spaced race members, a plurality of rollers therebetween and having cooperative rolling engagement with the bearing surfaces of said race members, a thrust shoulder on the inner of said race members for cooperating with said rollers for transfer of lateral thrust therebetween, and a cage for retaining said rollers, said cage having portions disposed between said rollers each provided with a surface complementary to and contacting a substantial portion of the bearing surface of the outer of said race members at the central part thereof over which said rollers roll whereby the same is guided during operation.

WILLIAM C. HEDGCOCK.